United States Patent
Hauenstein

(10) Patent No.: US 7,567,053 B2
(45) Date of Patent: Jul. 28, 2009

(54) MECHATRONIC INTEGRATION OF MOTOR DRIVE AND E-MACHINE, ESPECIALLY SMART-E-MOTOR

(75) Inventor: Henning Hauenstein, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 108 days.

(21) Appl. No.: 11/650,385

(22) Filed: Jan. 5, 2007

(65) Prior Publication Data

US 2008/0018290 A1 Jan. 24, 2008

Related U.S. Application Data

(60) Provisional application No. 60/756,747, filed on Jan. 6, 2006.

(51) Int. Cl.
*H02P 27/04* (2006.01)

(52) U.S. Cl. ............ 318/801; 318/400.26; 318/400.29; 310/64; 363/40; 363/98; 363/120

(58) Field of Classification Search .................. 318/58, 318/722, 801, 400.17, 400.26, 400.27, 400.29, 318/491, 538; 310/64, 71, 16, 52, 227; 361/274.3, 361/679.47, 702; 363/40, 56.01, 98, 120
See application file for complete search history.

(56) References Cited

U.S. PATENT DOCUMENTS

| 5,878,584 | A * | 3/1999 | Sasaki et al. .................. 62/115 |
| 6,313,598 | B1 * | 11/2001 | Tamba et al. ................. 318/722 |
| 6,617,715 | B1 * | 9/2003 | Harris et al. .................. 310/54 |
| 6,798,083 | B2 * | 9/2004 | Mueller ..................... 307/9.1 |
| 6,822,353 | B2 * | 11/2004 | Koga et al. .................... 310/64 |
| 6,992,409 | B2 * | 1/2006 | Torii et al. .................... 310/52 |
| 7,009,318 | B2 * | 3/2006 | Iritani et al. .................. 310/58 |
| 2002/0034087 | A1 * | 3/2002 | Suzuki et al. ............... 363/144 |
| 2003/0173839 | A1 * | 9/2003 | Torii et al. .................... 310/52 |
| 2004/0118142 | A1 * | 6/2004 | Hsu et al. .................. 62/259.2 |
| 2006/0086981 | A1 * | 4/2006 | Yamaguchi et al. ......... 257/347 |
| 2006/0202573 | A1 * | 9/2006 | Uehara et al. ................. 310/64 |
| 2007/0046224 | A1 * | 3/2007 | Korich et al. ............... 318/254 |

* cited by examiner

*Primary Examiner*—Bentsu Ro
*Assistant Examiner*—Antony M Paul
(74) *Attorney, Agent, or Firm*—Farjami & Farjami LLP

(57) ABSTRACT

The power switches of an inverter are mechanically integrated with an electric motor of a vehicle and are mounted on the end plate of the motor and employ short connections between the motor a-c terminals and the inverter a-c output terminals. Bond wireless modules are employed. The electronic controls for the inverter are mounted on a main control board which is positioned remotely from the inverter and is not subject to the heat and EMI produced by the inverter.

13 Claims, 5 Drawing Sheets

US 7,567,053 B2

MECHATRONIC INTEGRATION OF MOTOR DRIVE AND E-MACHINE, ESPECIALLY SMART-E-MOTOR

RELATED APPLICATIONS

This application claims the benefit of U.S. Provisional Application No. 60/756,747, filed Jan. 6, 2006, the entire disclosure of which is incorporated by reference herein.

FIELD OF THE INVENTION

This invention relates to the integration of a power supply module for the electric motor (E-motor) of a vehicle and more specifically relates to the separation and cooling of the power semiconductor devices (module) of the power supply and its electronic controls.

BACKGROUND OF THE INVENTION

Recent developments in the automotive market show an increasing demand for the use of electric motors within an automotive vehicle (car or truck, etc.). In particular, the electrification of a vehicle drive train requires powerful electric motors of typically, 20 kW to over 100 kW power. Present day hybrid-electric car concepts often even use 2 E-motors within the hybrid drive train.

These electric motors are normally driven by a 3-phase AC current which is provided from the DC bordnet through an inverter circuit. Therefore, these applications normally need a power control unit which controls and manages the electric power flow from the inverter to the E-motor. Thus, electric energy needs to be converted into mechanical energy and vice-versa. State-of-the-art hybrid systems therefore consist of an E-motor and a separate electronic box comprising the power management unit.

FIGS. 1, 2 and 3 show a typical example of such a state-of-the-art concept. A power control unit 10 with an inverter circuit 11 in a separate box or housing 12 (FIGS. 1 and 3) provides, via massive cables 13 (FIG. 1), the current connection to the E-motor 14.

One key element of the power control unit 10 is the DC/AC-inverter circuit 11. The main task of the inverter 11 is to transfer the DC-current/voltage into an AC-current/voltage and vice-versa. Converting DC- into AC-current is required in order to drive a motor powered by the DC-bordnet. This mode is also called "motor-mode" since the E-motor is used to drive the car.

Besides this "motor-mode" the E-motor can also be operated as a generator when mechanical energy from the car movement or from the combustion engine (not shown) is used to drive the E-motor 14. In that case mechanical energy is converted into electrical energy in order to charge the battery or to power the bordnet. In this "generator-mode" the inverter needs to convert AC-current generated by the motor into a DC current.

FIG. 1 shows a typical power control unit 10 driving E-motor 14. The top cover of the box 12 is removed to show inverter section 11. The inverter is formed in one or more modules 11 which are provided with output electric connections 13 between power modules, capacitors 20 (FIG. 2) and external connectors.

Not shown are the main circuit board and EMI screen which are on top of the power stage inside of the box 12.

FIG. 3 shows the closed power control box 12 of FIG. 1. FIG. 2 shows the heatsink 21 and the inverter modules 12 mounted on top thereof.

The inverter units 11 are mounted in the relatively big and heavy box or housing 12 forming the power control or management unit. Normally a main control board (not shown) is placed inside of this box 12 which includes among other circuits, the driver-ICS for the inverter, a microcontroller, software, protection and sensor analyzing circuits, and communication and I/O interfaces for communication with the board computer or the combustion engine control unit. The box 12 with the power control unit can also include further elements like a DC/DC converter for providing various voltage levels for the bordnet and other electronic systems.

Typical elements of such a power control unit according to the state-of-the-art are:

1 to 3 power modules (e.g. MOSFETs or IGBTs in a half-, H- or full-bridge configuration) for the inverter 11 which normally has to handle currents of several hundred amperes.

A heatsink 21 which normally needs to be actively cooled by a fluid coolant applied to inlet and outlet conduits to deal with the power losses of the inverter 11.

A connector frame providing the mounting space for (high) power connections (between E-motor phases and inverter) and the signal connections (between power control unit and the bordnet systems).

High current connectors or other assembly elements mounted to the connector frame for the wiring of the inverter to the E-motor.

Low power signal connectors for interfacing with the bordnet.

A box-cover.

The power control unit 10 is a separate box 12 which is placed in suitable locations of a car (e.g. in the trunk, under the passenger seat, in the engine compartment, or elsewhere) and is connected by cables or thick wires 13 to the E-motor 14 and other components of the drive drain.

The disadvantage of this arrangement is that long high current and, normally, high voltage cables 13 have to be provided between the E-motor 14 and power control unit 10. This incurs high costs. The required high-voltage protection is also a source of high power losses within the cables. The weight and the space requirements of the thick cables is also disadvantageous. Long cables are further disadvantageous for the EMI-requirements of the car due to the generation of electric noise and due to the inductance that they introduce into the electric circuitry of the power management system.

Further, the inverter power modules inside of the box 12 need protection against environmental conditions like dust, water, chemicals, and the like. The disadvantages of this are:

High cost added by the mechanical components like heatsink, connector frame, tight cover. The need for a connector frame with connectors is required by the physical separation of the inverter 11 and the E-motor.

The relatively large space requirements due to the box 12 itself.

Space requirements for placing the power unit within the car.

Another disadvantage of the present assembly is that the sensitive main control board (carrying a micro controller, ICS and other elements) which cannot withstand high temperatures is close to the high power inverter 11 which produces considerable heat inside of the box 10. While the power switches of the inverter (MOSFETs, IGBTs or the like) normally can work at junction-temperatures of up to 175° C. these sensitive main board components are typically rated only up to 125° C. Therefore, additional means for thermal management of the power stage and main board within the box is needed, adding further costs, weight, space, and thermal burdens.

Besides thermal protection, the main board also needs to be protected from the electric field and noise generated when switching high currents in the power stage of the inverter 11. This EMI noise can disturb the sensitive functions of the main board. Thus, additional EMI protection is required for the main board in box 12. Thus, the main board is normally covered with a metal screening plate located between main board and power stage of the inverter to damp or screen the electric fields.

SUMMARY OF THE INVENTION

In accordance with the invention, the power switching devices (IGBTs or MOSFETs) forming the inverter are separately housed from their controls and are mounted closely adjacent to or on the E-motor housing. The control circuits for the inverters are separately housed in a location remote from the power switching device assemblies and are connected by low current, low voltage signal conductors, or even by a radio type connection.

A number of advantages flow from the novel separation concept:
a) improved mechanical properties:
  i) there is no need for long, high power cables between inverter and E-motor;
  ii) reduced weight due to reduced number of parts; and
  iii) higher reliability due to reduced number of parts (especially due to the elimination of connectors).
b) improved electrical and thermal properties:
  i) the physical separation of power stage and main board results in no heating of the remote main control board by the power stage;
  ii) reduced distance between gate drive and power switches;
  iii) increased distance between the power stage and thermally sensitive main board elements;
  iv) reduced power loss due to close connection of motor and inverter;
  v) reduced system inductivity;
  vi) reduced EMI due to close placement of inverter and motor.
c) improved manufacturing properties:
  i) inverter assembly can be done at the motor manufacturer facility;
  ii) reduced number of components;
  iii) sharing of functional elements between power unit and E-motor like e.g. cooling elements (or heatsink for liquid cooling of both motor and electronics or motor rotation used as fan for air cooling the electronics);
d) low manufacturing and test costs:
  i) E-motor can be tested together with the inverter as a fully functional stand-alone system;
  ii) an optimum package of motor and inverter can be designed;
  iii) low cost system assembly instead of microelectronic system integration and system assembly of motor and control unit in a second step.
e) significant customer advantages:
  i) reduced system cost due to reduced number of parts;
  ii) E-motor manufacturer can buy and assemble the power modules according to the invention without micro-electronic assembly lines. The E-motor manufacturer can sell a fully functional smart-E-motor with integrated power electronics;
  iii) OEM advantage. The E-motor and inverter can be bought from one supplier as fully tested system; no need for integration of a motor and an inverter from two different suppliers;
  iv) reduced manufacturing effort and cost at the car or power train assembly due to the availability of a smart-E-motor with integrated inverter;
  v) reduced space requirements within the vehicle.
f) platform suitability
  i) the invention can be used to equip different motors and car models;
  ii) smart E-motor can be standardized on a platform, customization can be done by the software on the main controller board.
  iii) scalability in terms of power and size.

The above described invention addresses mainly high power E-motors used for hybrid electric vehicles. However, the invention provides an advantageous integration concept for all E-machines in other applications and can be extended to various power classes. Thus, the invention can be used for other industrial, consumer and other motor drive applications.

DETAILED DESCRIPTION OF THE DRAWINGS

Figure 1:
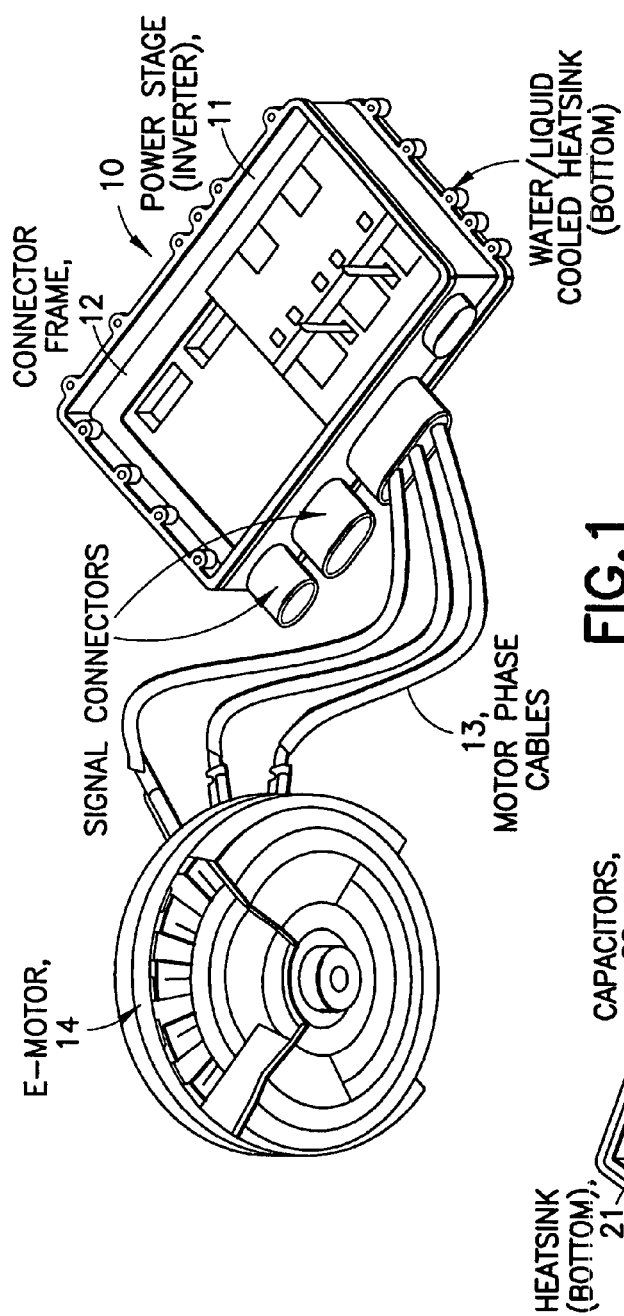
FIG. 1 shows a prior art assembly of an E-motor and a remote power control unit with power electronics (inverter) and its control circuitry).
Figure 3:
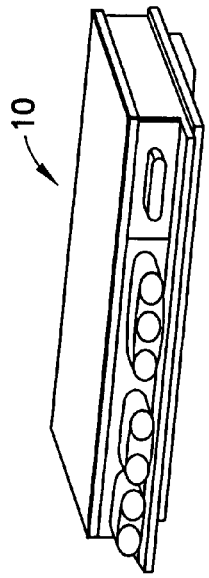
FIG. 3 shows the power control unit of FIG. 1.
Figure 2:
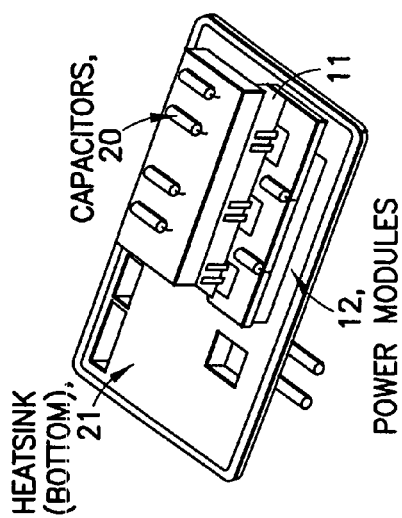
FIG. 2 shows a perspective view of a typical power module for the system of FIG. 1.
Figure 4:
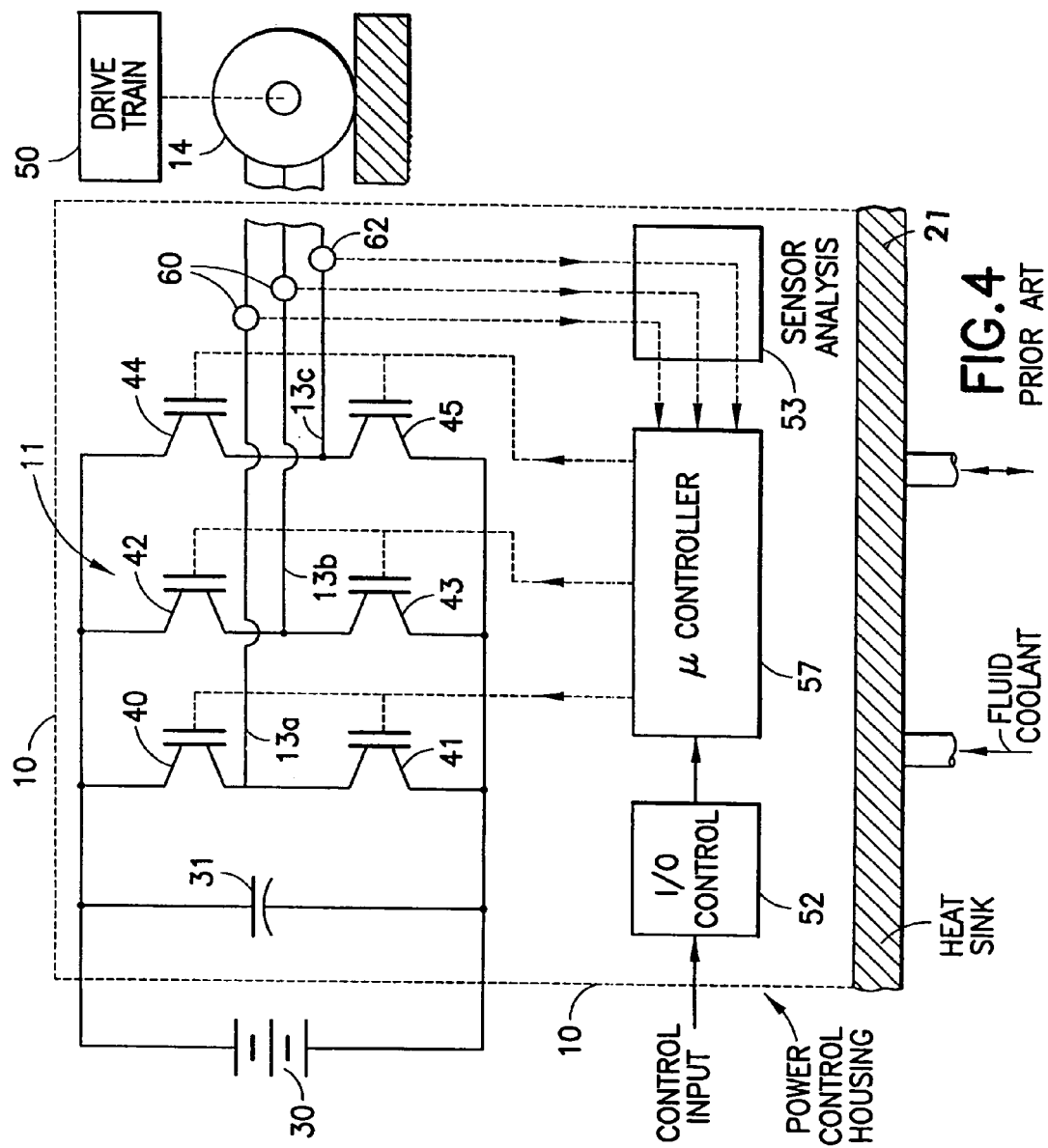
FIG. 4 is a partial block diagram of the arrangement of prior art FIGS. 1, 2 and 3.

Referring first to FIG. 4, the known system of FIGS. 1, 2 and 3 is shown in partial block fashion, with similar components having similar identifying numerals. Thus, the power control and inverter unit 10 is shown within dotted line or box 10. A vehicle battery 30 or the DC-bordnet has a d-c bus capacitor 31 across its terminals and connected to a three phase inverter circuit 11, capacitor 31 and inverter 11 are within box 10.

The inverter 11 consists of 3 half-bridges which may be separate modules, or can be assembled on a common heatsink 21 which may be air or liquid cooled.

The half bridges of the inverter 11 are formed by IGBTs 40, 41; 42, 43; and 44, 45 respectively. The nodes of each half-bridge pair are connected to long high current capacity cables 13a, 13b and 13c which are connected to the a-c inputs of remotely positioned 3 phase E-motor 14. E-motor 14 is connected to the vehicle drive train 50 or other mechanical load driven by the power control unit.

A microcontroller 51 has outputs connected to the gates of IGBTs 40 to 45 as shown by dotted lines. Controller 51 is mounted within box 10 and is coupled to controller 51. An I/O control circuit 52 and sensor analysis circuit 53 is also mounted within box 10 and is coupled to controller 51. The controller 51, I/O control 52 and sensor circuit 53 are preferably mounted on a common main control board (not shown). Current sensors 60, 61 and 62 on cables 13a, 13b and 13c provide inputs to sensor circuit 53. The controller 51 will then operate the inverter 11 as required by the outputs of I/O control 52 and sensor analysis circuit 53, using suitable software. Other control circuits, not shown, such as DC to DC converters and protective circuits may also be mounted on the board with circuits 51, 52 and 53.

As previously pointed out, these control circuits are close to and subject to the high temperatures of the power devices 40 to 45 within box 10 and must be thermally insulated to prevent their thermal damage. They must also be isolated from EMI radiation from switches 40 to 45 by screening or the like.

Further, the box 10 should be located remotely from the hot engine compartment containing motor 14, thus requiring long cables 13a, 13b and 13c.

Figure 5:
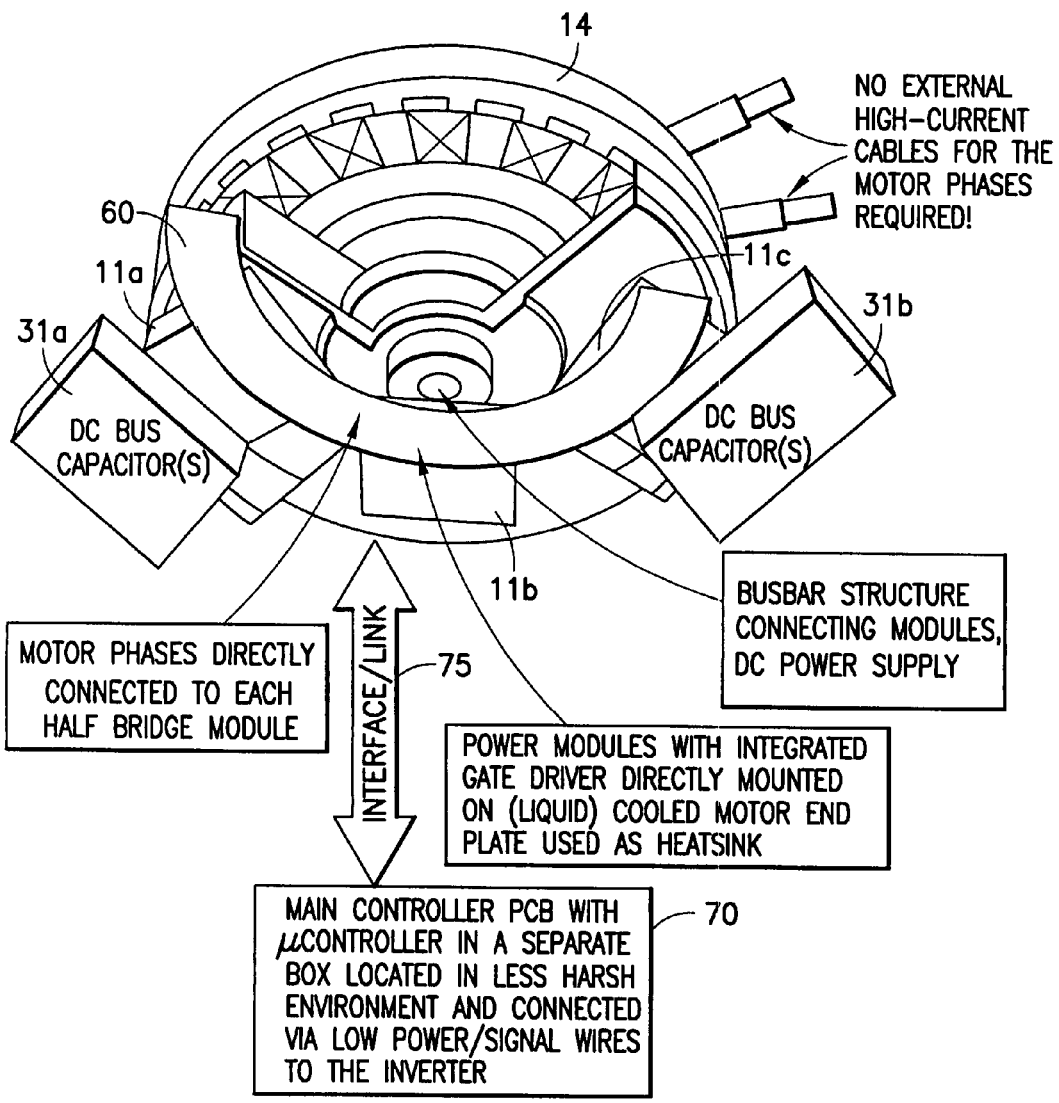
FIG. 5 shows a schematic diagram of a system in accordance with the invention.
Figure 6:
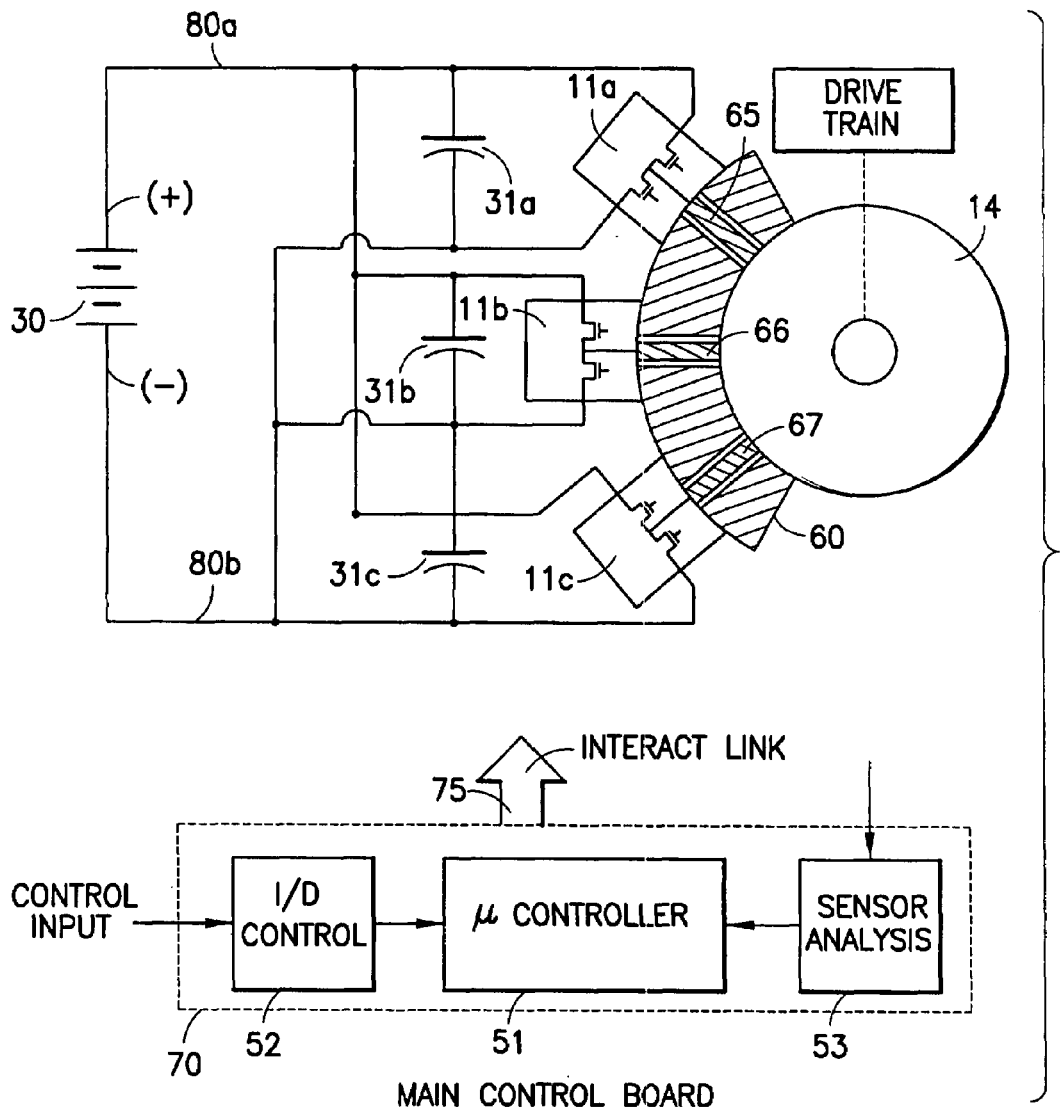
FIG. 6 is a block diagram showing the arrangement of FIG. 5 in accordance with the invention.

In accordance with the invention, and as shown in FIGS. 5 and 6, the motor 14 has a mounting plate 60 or motor end shield which receives 3 modules 11a, 11b and 11c these modules contain respective pairs of IGBTs 40, 41; 42, 43; and 44, 45 of inverter 11 with the nodes of each pair connected to a respective a-c input of motor 14, as by short insulated conductors 65, 66 and 67 respectively (FIG. 6) in plate 60. The d-c bus capacitor 31 may be divided into capacitors 31a, 31b and 31c for each phase which may also be directly mounted on plate 60 as shown in FIG. 5.

The half bridge modules 11a, 11b and 11c may each be constructed as shown in detail in copending application Ser. No. 11/641,270, filed Dec. 19, 2006 (IR-3174) the contents of which are incorporated herein in their entirety by reference. Preferably, the modules are bond-wireless modules.

The main control board 70, carrying control circuits 51, 52 and 53 is then mounted in a separate housing located in a less harsh environment than that of motor 14 and are connected to the gate drive circuits of IGBTs 40 through 45 by interface link 75 consisting of low power signal wiring.

Thus, the inverter 11 is mechanically (or mechatronically) integrated with the motor 14 and the controls are removed from the heat and mechanical stress of inverter 11.

Figure 7:
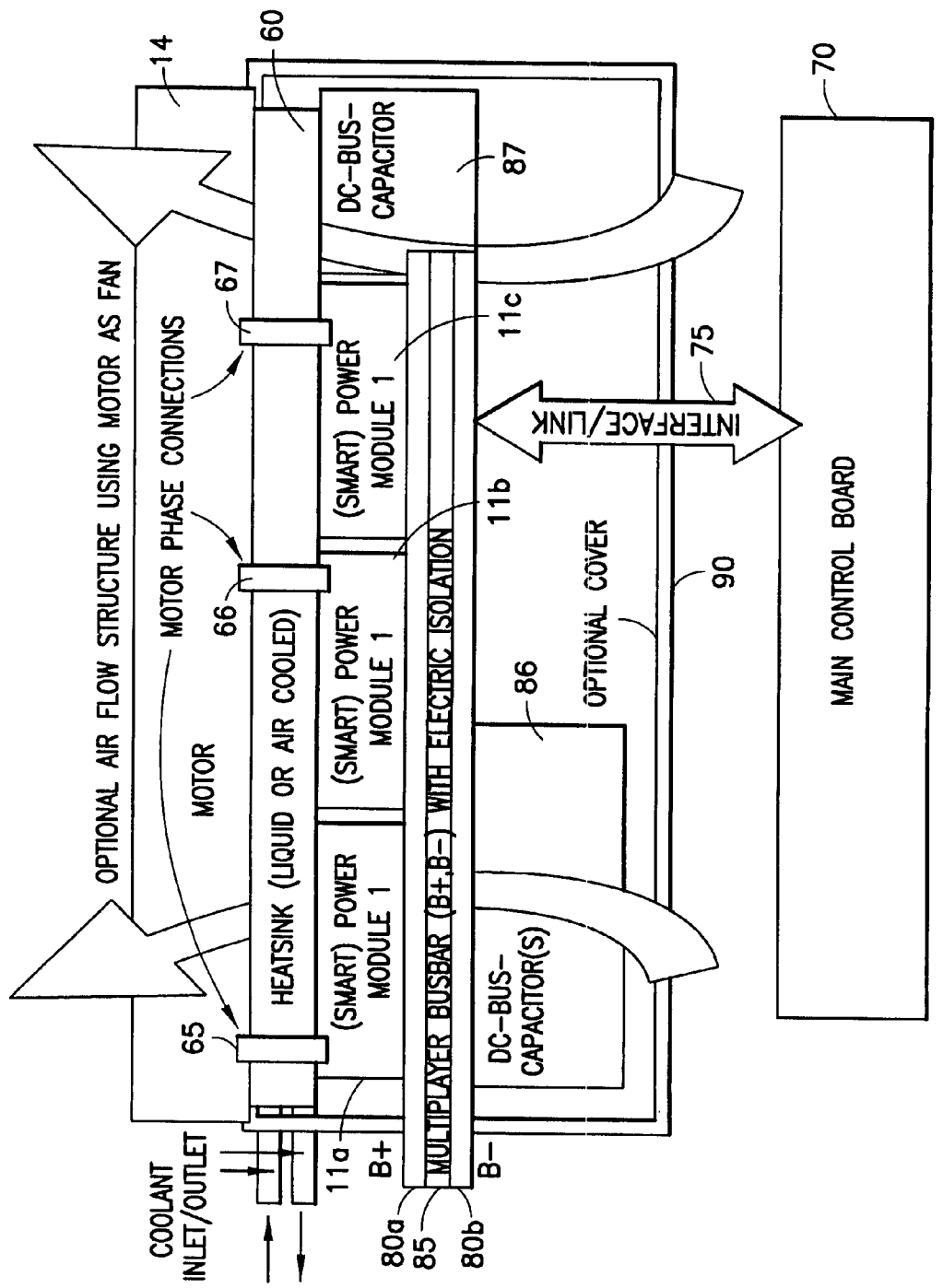
FIG. 7 is a schematic diagram of the invention system as shown in FIGS. 5 and 6.

FIG. 7 shows an arrangement like that of FIGS. 5 and 6 with several variations. Thus, d-c bus bars 80a and 80b are separated by dielectric spacer 85. DC bus capacitors 86 and 87 are connected across bus bars 80a and 80b as shown, and in heat sink contact with bus bar 80b and plate 60 respectively. Inverter modules 11a, 11b and 11c are mounted on bus 80a and press against plate 60. An optional cover 90 encloses the modules and capacitors.

The plate 60 is fluid cooled, by liquid or air coolant. The motor may drive a fan to force cooling air flow shown by arrows 91 and 92 through the enclosed volume contained by cover 90.

It will be noted, that, in accordance with the invention and as shown in FIGS. 5, 6 and 7:

At least one power module (11a) provides various possible electric configurations (like half-, full-, H-bridges of MOSFETs or IGBTs for example) as the power switch to the motor 14. Three identical half-bridge modules can also be used for a 3 phase motor.

The power modules can be a pure power stage or have a gate driver integrated in the power module (smart-power-modules).

The (smart) power modules 11a, 11b and 11c may be hemetically sealed and protected by a plastic cover like a molded housing for example.

The power modules provide leadframe connections which are directly connected to the motor phases e.g. by soldering, welding, screwing, or the like.

The power modules 11a, 11b and 11c are mounted on a heatsinking metal plate 60 on the motor.

The heatsink is formed by the motor end plate 60 or may be mounted to the motor, providing cooling for the inverter electronics and, if required, to cool the motor. For example, the motor oil coolant can loop through plate 60.

The motor 14 can be shaped so that the rotating part of the motor acts as a coolant fan providing additional air flow and air cooling to the electronics.

The DC busbar may be formed as a low inductance leadframe which can comprise two or more electrically isolated metal layers (e.g. in order to form at least a Battery+ and Battery− connection to the DC bordnet 30) and can support the DC bus capacitors 31a, 31b, 31c or the inverter modules.

The DC bus capacitors 31a, 31b, 31c are mounted close to the power modules 11a, 11b, 11c respectively and connected via a busbar structure to the modules.

The DC bus capacitors 31a, 31b, 31c are in contact with the heatsink 60 or other cooling elements of the motor-inverter-system.

The main controller board 70 can be mounted close to the motor 14 and inverter 11 but, preferably, is physically separated to a less harsh environment (e.g. in a separate box) and is connected via wires/cables to the inverter circuit.

The E-motor-inverter system provides connection to the DC-bordnet, e.g. two high power cable connectors 80a, 80b or other mounting elements.

The inverter section can be protected by an additional cover plate (not shown).

The optional inverter cover plate can provide a flow structure for air cooling driven by the motor 14.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A power control system for an a-c motor having input a-c terminals; said power control system comprising a plurality of inverter circuits each in a separate inverter module and each inverter module having respective a-c and d-c terminals; and a control circuit for said inverter circuits; a heat sink fixed to said motor at one side thereof; said inverter modules being mounted on another side of said heat sink opposite to said one side whereby said heat sink is disposed between said inverter modules and said motor, and each inverter module having it's a-c terminal connected to a respective input a-c terminal of said a-c motor by a respective short power conductor that extends through said heatsink; said control circuit including a microcontroller for controlling said inverter circuits being mounted remotely from said inverter modules and coupled thereto by a low power interface link, and each said inverter circuit including a plurality of switching devices.

2. The system of claim 1, wherein said plurality of switching devices are IGBTs.

3. The system of claim 2, wherein each said inverter circuit is one phase of a three phase bridge connected circuit and said motor is a three phase motor.

4. The system of claim 1, wherein each said inverter circuit is one phase of a three phase bridge connected circuit and said motor is a three phase motor.

5. The system of claim 4, wherein said inverter circuits comprise three half bridge circuits.

6. The system of claim 5, wherein said plurality of switching devices are IGBTs.

7. The system of claim 5, wherein said control circuit further comprises I/O modules coupled to said microcontroller and a sensor module coupled between the output current of said inverter circuits and said microcontroller.

8. The system of claim 1, wherein said control circuit further comprises I/O modules coupled to said microcontroller and a sensor module coupled between the output current of said inverter circuits and said microcontroller.

9. The system of claim 1, which further includes a fluid coolant circulated in said heatsink for cooling both said motor and said switching devices.

10. The system of claim 1, which further includes a d-c source connected to said d-c terminals of said inverter circuits and a d-c bus capacitor connected in parallel with said d-c source.

11. The system of claim 10, wherein said d-c bus capacitor is mounted on said heat sink.

12. The system of claim 11, wherein each said inverter circuit is a three phase bridge connected circuit and said motor is a three phase motor.

13. The system of claim 11, which further includes a fluid coolant circulated in said heatsink for cooling both said motor and said switching devices.

* * * * *